(12) United States Patent
Wu (10) Patent No.: US 11,609,648 B1
(45) Date of Patent: Mar. 21, 2023

(54) STYLUS PEN

(71) Applicant: Chicony Electronics Co., Ltd., New Taipei (TW)

(72) Inventor: Kuo-Nan Wu, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 17/806,737

(22) Filed: Jun. 14, 2022

Related U.S. Application Data

(60) Provisional application No. 63/263,235, filed on Oct. 29, 2021.

(30) Foreign Application Priority Data

Dec. 28, 2021 (TW) .................................. 110149223

(51) Int. Cl.
*G06F 3/0354* (2013.01)
(52) U.S. Cl.
CPC .............................. *G06F 3/03545* (2013.01)
(58) Field of Classification Search
CPC ................................................. G06F 3/03545
USPC ............................................................ 345/179
See application file for complete search history.

(56) References Cited

U.S. PATENT DOCUMENTS

| | | | |
|---|---|---|---|
| 10,071,591 B1* | 9/2018 | Peyton | .................... B43K 7/005 |
| 2006/0214756 A1* | 9/2006 | Elliott | .................... H02N 15/00 |
| | | | 335/306 |
| 2011/0193827 A1* | 8/2011 | Liang | .................. G06F 3/03545 |
| | | | 345/179 |
| 2018/0275780 A1* | 9/2018 | Tzou | ..................... G06F 1/1656 |

FOREIGN PATENT DOCUMENTS

| | | | |
|---|---|---|---|
| CN | 210864653 U | * | 6/2020 |
| CN | 210864653 U | | 6/2020 |
| KR | 2009004727 U | * | 5/2009 |
| TW | M323078 U | | 12/2007 |
| TW | M404405 U | | 5/2011 |
| TW | I626564 B | | 6/2018 |
| TW | M603995 U | | 11/2020 |

* cited by examiner

*Primary Examiner* — Mark Edwards
(74) *Attorney, Agent, or Firm* — CKC & Partners Co., LLC (57) ABSTRACT

A stylus pen includes a rod body, a cover body, and a positioning module. The rod body includes a main body portion and a sleeve portion connected to each other. The cover body is configured to be sleeved onto the sleeve portion, and is configured to move relative to the rod body to a first position and a second position along a first axial direction. The positioning module is disposed between the sleeve portion and the cover body, and is configured to generate changes of force to the cover body and the rod body in a second axial direction when the cover body moves to the first position and the second position relative to the rod body.

16 Claims, 9 Drawing Sheets

STYLUS PEN

CROSS-REFERENCE TO RELATED APPLICATION

This application claims priority to U.S. Provisional Application Ser. No. 63/263,235 filed Oct. 29, 2021, and Taiwan Application Serial Number 110149223, filed Dec. 28, 2021, the disclosures of which are incorporated herein by reference in their entireties.

BACKGROUND

Technical Field

The disclosure relates to a stylus pen.

Description of Related Art

As for ways of operating portable electronic devices nowadays, touch display devices are widely used in various portable electronic devices because the touch display devices can be intuitively operated by users. In this regard, in order to prevent fingers from causing too many scratches on a touch panel when touching, stylus pens are developed accordingly.

Taking a capacitive touch display device as an example, when the stylus pen touches a specific position of the touch panel, the capacitance of the sensing electrode at the position will change accordingly, so that the touch display device can know the touch position of the stylus pen, so as to execute the corresponding command.

In order to meet the design trend of thin and light electronic products, the size of the stylus pen is also developing to be light, thin, and short, so that the stylus pen is convenient for users to carry or can be stored in a reserved space in an electronic device. In order to prevent the smoothness of the operation from being affected by the inconvenient holding of the thin and short stylus pen, there are currently retractable stylus pens on the market. However, these retractable stylus pens can not provide a noticeable positioning feel when being retracted.

Accordingly, how to provide a stylus pen to solve the aforementioned problems becomes an important issue to be solved by those in the industry.

SUMMARY

An aspect of the disclosure is to provide a stylus pen that can efficiently solve the aforementioned problems.

According to an embodiment of the disclosure, a stylus pen includes a rod body, a cover body, and a positioning module. The rod body includes a main body portion and a sleeve portion connected to each other. The cover body is configured to be sleeved onto the sleeve portion, and is configured to move relative to the rod body to a first position and a second position along a first axial direction. The positioning module is disposed between the sleeve portion and the cover body, and is configured to generate changes of force to the cover body and the rod body in a second axial direction when the cover body moves to the first position and the second position relative to the rod body.

In an embodiment of the disclosure, the second axial direction is substantially perpendicular to the first axial direction.

In an embodiment of the disclosure, when the cover body moves to the first position, the second position, and a third position between the first position and the second position, the positioning module respectively applies a first force, a second force, and a third force to the cover body and the rod body in the second axial direction. The third force is different from the first force and the second force.

In an embodiment of the disclosure, the cover body includes a casing and an engaging member. The casing is configured to be sleeved onto the sleeve portion. The engaging member is disposed in the casing and configured to be slidably engaged with the sleeve portion.

In an embodiment of the disclosure, the positioning module includes an engaging structure. The engaging structure is disposed on the engaging member.

In an embodiment of the disclosure, the engaging member has an elastic arm. The engaging structure is disposed on the elastic arm.

In an embodiment of the disclosure, the stylus pen further includes an electrical connection port. The electrical connection port is disposed on the sleeve portion. When the cover body is located at the first position relative to the rod body, the electrical connection port is covered by the cover body. When the cover body is located at the second position relative to the rod body, the cover body leaves and exposes the electrical connection port.

In an embodiment of the disclosure, an end of the sleeve portion away from the main body portion has a buckling groove. The cover body includes a buckling block. When the cover body moves to the first position relative to the rod body, the buckling block is buckled to the buckling groove.

According to an embodiment of the disclosure, a stylus pen includes a rod body, a cover body, and a positioning module. The rod body includes a main body portion and a sleeve portion connected to each other. The cover body is configured to be sleeved onto the sleeve portion, and is configured to move relative to the rod body to a first position and a second position along a first axial direction. The positioning module is disposed between the sleeve portion and the cover body and includes two first engaging structures and a second engaging structure. The first engaging structures are disposed on one of the cover body and the rod body. The second engaging structure is disposed on another of the cover body and the rod body. When the cover body is located at the first position relative to the rod body, the second engaging structure is engaged with one of the first engaging structures. When the cover body is located at the second position relative to the rod body, the second engaging structure is engaged with another of the first engaging structures.

In an embodiment of the disclosure, when the cover body is located at a third position between the first position and the second position relative to the rod body, the second engaging structure slidably abuts against the one of the cover body and the rod body.

In an embodiment of the disclosure, each of the first engaging structures is an engaging slot. The second engaging structure is a protruding block.

In an embodiment of the disclosure, the second engaging structure is an elastic body.

In an embodiment of the disclosure, the sleeve portion has a concave portion. The second engaging structure is accommodated in the concave portion.

In an embodiment of the disclosure, the second engaging structure has a guiding inclined surface. The guiding inclined surface is configured to be engaged with the first engaging structures.

In an embodiment of the disclosure, the cover body includes a casing and an engaging member. The casing is configured to be sleeved onto the sleeve portion. The engaging member is disposed in the casing and configured to be slidably engaged with the sleeve portion.

In an embodiment of the disclosure, the first engaging structures are disposed on the engaging member.

In an embodiment of the disclosure, the engaging member has an elastic arm. One of the first engaging structures is disposed on the elastic arm.

In an embodiment of the disclosure, an end of the sleeve portion away from the main body portion has a buckling groove. The cover body includes a buckling block. When the cover body moves to the first position relative to the rod body, the buckling block is buckled to the buckling groove.

According to an embodiment of the disclosure, a stylus pen includes a rod body, a cover body, and a positioning module. The rod body includes a main body portion and a sleeve portion connected to each other. The cover body is configured to be sleeved onto the sleeve portion, and is configured to move relative to the rod body to a first position and a second position along a first axial direction. The positioning module is disposed between the sleeve portion and the cover body and includes two first magnetic members and a second magnetic member. The first magnetic members are disposed on one of the cover body and the rod body. The second magnetic member is disposed on another of the cover body and the rod body. When the cover body is located at the first position relative to the rod body, the second magnetic member and one of the first magnetic members are aligned in a second axial direction and attract each other. When the cover body is located at the second position relative to the rod body, the second magnetic member and another of the first magnetic members are aligned in the second axial direction and attract each other.

In an embodiment of the disclosure, the positioning module further includes a third magnetic member. The third magnetic member is disposed on the one of the cover body and the rod body and located between the first magnetic members. When the cover body is located at a third position between the first position and the second position relative to the rod body, the second magnetic member and the third magnetic member are aligned in the second axial direction and repel each other.

Accordingly, in the stylus pen of the disclosure, the positioning module disposed between the sleeve portion of the rod body and the cover body can generate force changes on the cover body and the rod body when the cover body is located at the first position and the second position relative to the rod body. In this way, when the cover body moves to the first position and the second position relative to the rod body, a positioning feel can be provided.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 1A:
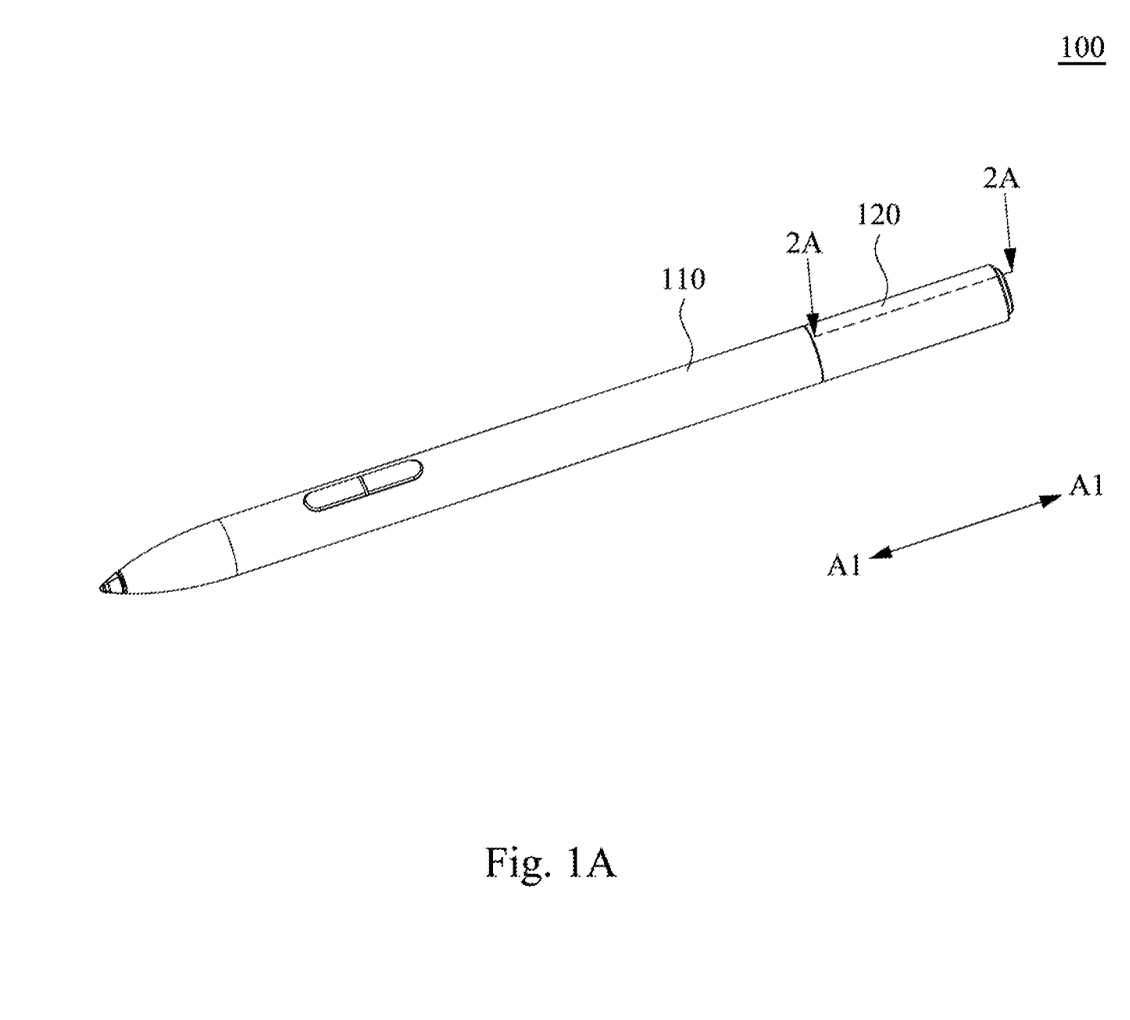
FIG. 1A is a perspective view of a stylus pen according to an embodiment of the disclosure, in which a cover body is located at a first position relative to a rod body.
Figure 1B:
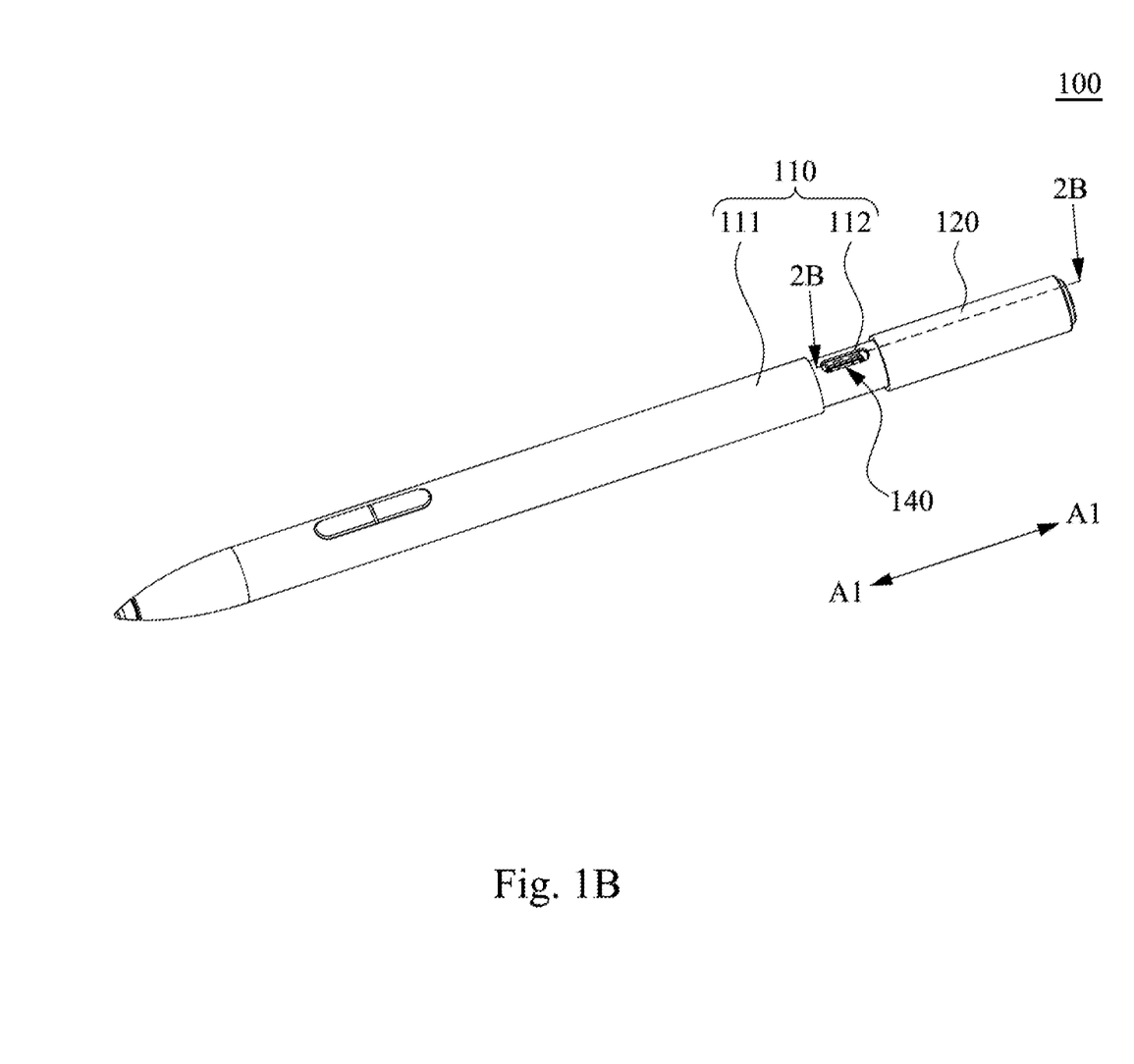
FIG. 1B is another perspective view of the stylus pen in FIG. 1A, in which the cover body is located at a second position relative to the rod body.

Reference is made to FIGS. 1A and 1B. FIG. 1A is a perspective view of a stylus pen 100 according to an embodiment of the disclosure, in which a cover body 120 is located at a first position relative to a rod body 110. FIG. 1B is another perspective view of the stylus pen 100 in FIG. 1A, in which the cover body 120 is located at a second position relative to the rod body 110. The stylus pen 100 of the embodiment may be applied to an electronic device having a touch screen, such as a Personal Digital Assistant (PDA), an electronic dictionary, a notebook computer, a mobile phone, or other handheld devices. Taking the capacitive stylus pen 100 as an example, a soft conductive material is used as the material of the pen tip. Since the material of the pen tip is conductive, the capacitance value of the surface of the touch screen can be changed when the pen tip is in contact with the capacitive touch screen, so that the sensing signal can be extracted.

Figure 1C:
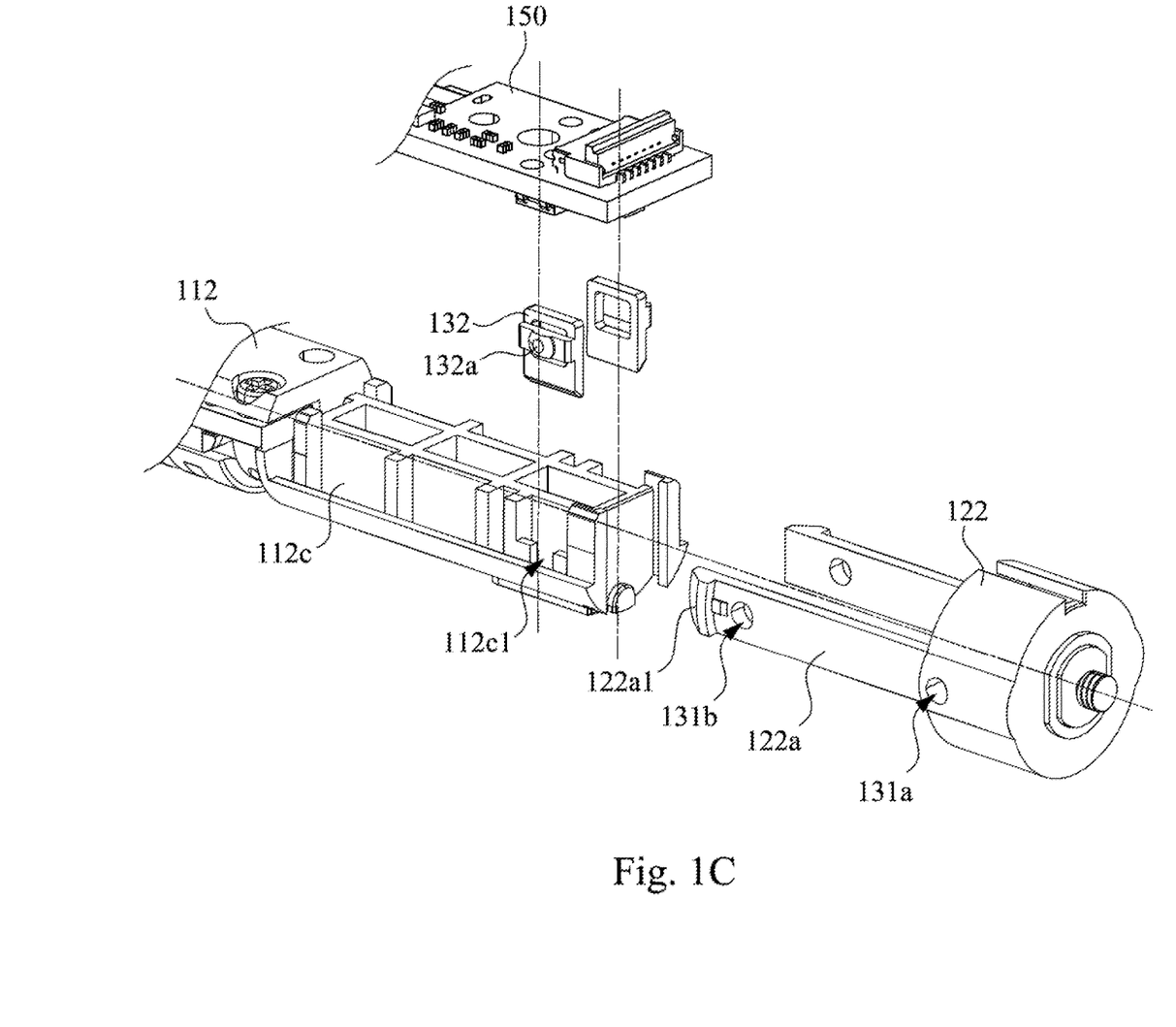
FIG. 1C is an exploded view of some components of the stylus pen according to an embodiment of the disclosure.

As shown in FIGS. 1A and 1B, in the embodiment, the stylus pen includes a rod body 110 and a cover body 120. The rod body 110 includes a main body portion 111 and a sleeve portion 112. The sleeve portion 112 is connected to an end of the main body portion 111. The cover body 120 is configured to be sleeved onto the sleeve portion 112, and is configured to move relative to the rod body 110 to a first position and a second position along a first axial direction A1. Specifically, as shown in FIG. 1A, when the cover body 120 is located at the first position relative to the rod body 110, the cover body 120 is completely sleeved onto the sleeve portion 112 of the rod body 110, so only the cover body 120 and the main body portion 111 of the rod body 110 can be seen from the appearance of the stylus pen 100. As shown in FIG. 1B, when the cover body 120 is located at the second position relative to the rod body 110, the cover body 120 only partially covers a part of the sleeve portion 112 of the rod body 110, so the main body portion 111 and the sleeve portion 112 of the rod body 110 and the cover body 120 can be seen from the appearance of the stylus pen Reference is made to FIG. 1C. FIG. 1C is an exploded view of some components of the stylus pen 100 according to an embodiment of the disclosure. As shown in FIGS. 1B and 1C, in the embodiment, the stylus pen 100 further includes an electrical connection port 140 and a circuit board 150. The electrical connection port 140 is disposed on the sleeve portion 112. The circuit board 150 is disposed inside the housing of the rod body 110 and communicates with the electrical connection port 140. When the cover body 120 is located at the first position relative to the rod body 110, the electrical connection port 140 is covered by the cover body 120. When the cover body 120 is located at the second position relative to the rod body 110, the cover body 120 leaves and exposes the electrical connection port 140.

In some embodiments, the stylus pen 100 further includes a battery (not shown). The circuit board 150 is electrically connected to the battery. In this way, the user can charge the battery inside the stylus pen 100 through the circuit board 150 in the electrical connection port 140.

In some embodiments, the stylus pen 100 further includes a data processing element (not shown, such as a processor). The electrical connection port 140 is electrically connected to the data processing element. In this way, the user can transmit data to the data processing element inside the stylus pen 100 through the electrical connection port 140.

In some embodiments, the electrical connection port 140 conforms to the USB Type C specification, but the disclosure is not limited in this regard.

Figure 2A:
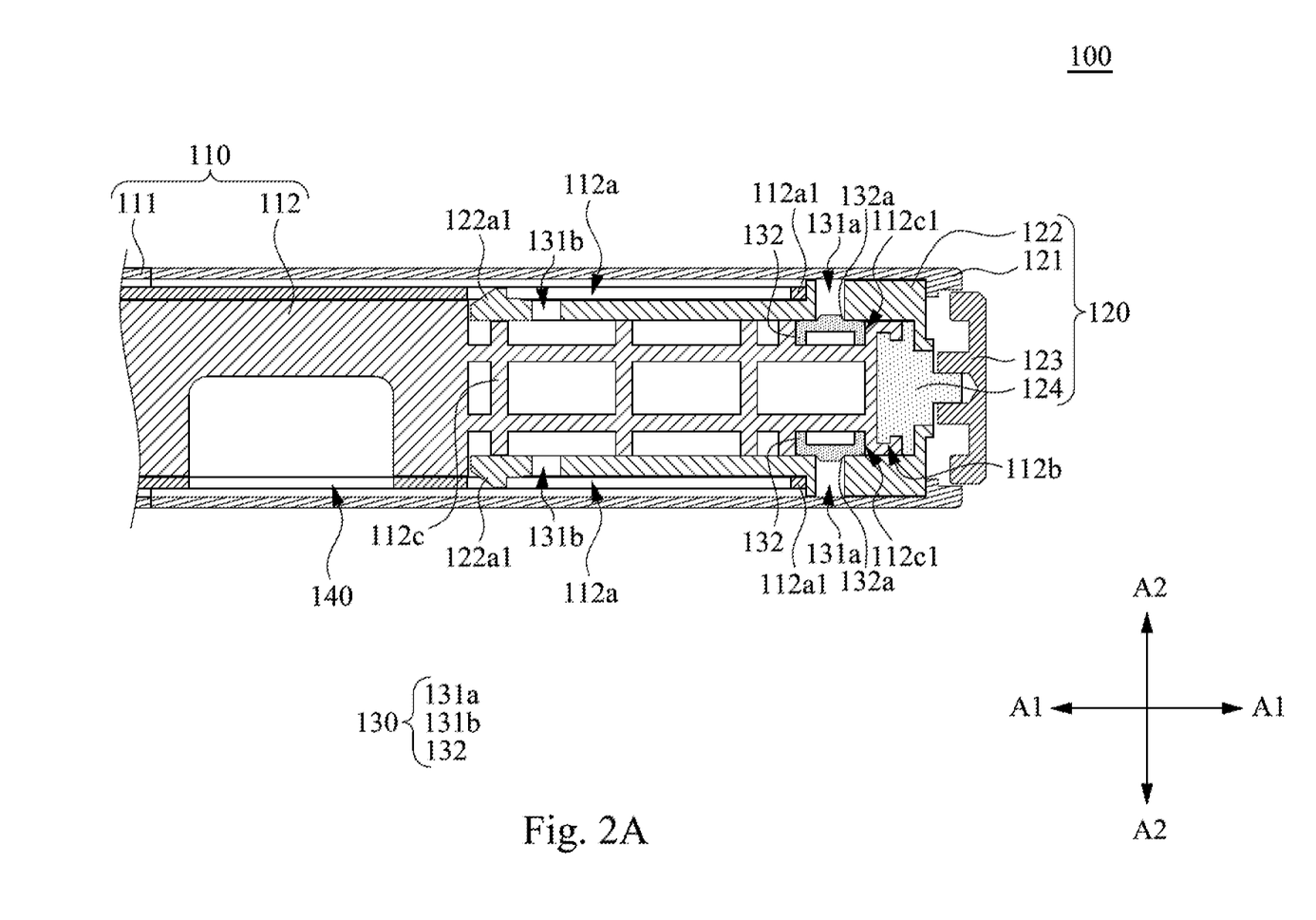
FIG. 2A is a partial cross-sectional view of the stylus pen in FIG. 1A taken along line 2A-2A.
Figure 2B:
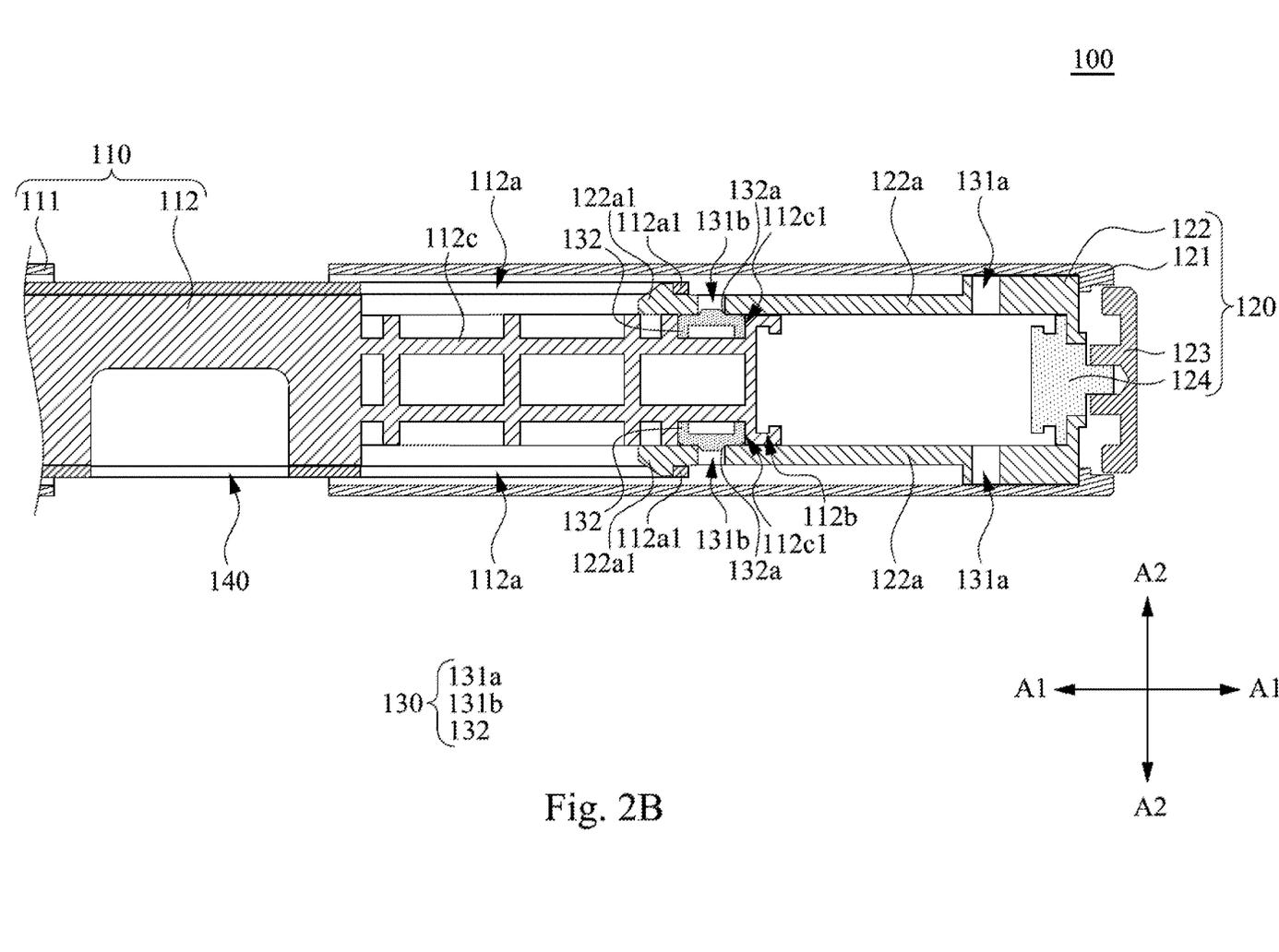
FIG. 2B is a partial cross-sectional view of the stylus pen in FIG. 1B taken along line 2B-2B.

Reference is made to FIGS. 2A and 2B. FIG. 2A is a partial cross-sectional view of the stylus pen 100 in FIG. 1A taken along line 2A-2A, in which the cover body 120 is located at the first position relative to the rod body 110. FIG. 2B is a partial cross-sectional view of the stylus pen 100 in FIG. 1B taken along line 2B-2B, in which the cover body 120 is located at the second position relative to the rod body 110. As shown in FIGS. 2A and 2B, in the embodiment, the stylus pen 100 further includes positioning module 130. The positioning module 130 is disposed between the sleeve portion 112 of the rod body 110 and the cover body 120, and is configured to generate changes of force to the cover body 120 and the rod body 110 in a second axial direction A2 when the cover body 120 is located at the first position and the second position relative to the rod body 110.

Specifically, in the embodiment, the positioning module 130 includes two first engaging structures 131a, 131b and a second engaging structure 132. The first engaging structures 131a, 131b are disposed on the cover body 120. The second engaging structure 132 is disposed the sleeve portion 112 of the rod body 110. When the cover body 120 is located at the first position relative to the rod body 110, the second engaging structure 132 is engaged with the first engaging structure 131a (as shown in FIG. 2A). When the cover body 120 is located at the second position relative to the rod body 110, the second engaging structure 132 is engaged with the first engaging structure 131b (as shown in FIG. 2B). In this way, the positioning module 130 can provide a positioning feel when the cover body 120 moves to the first position and the second position relative to the rod body 110.

Figure 2C:
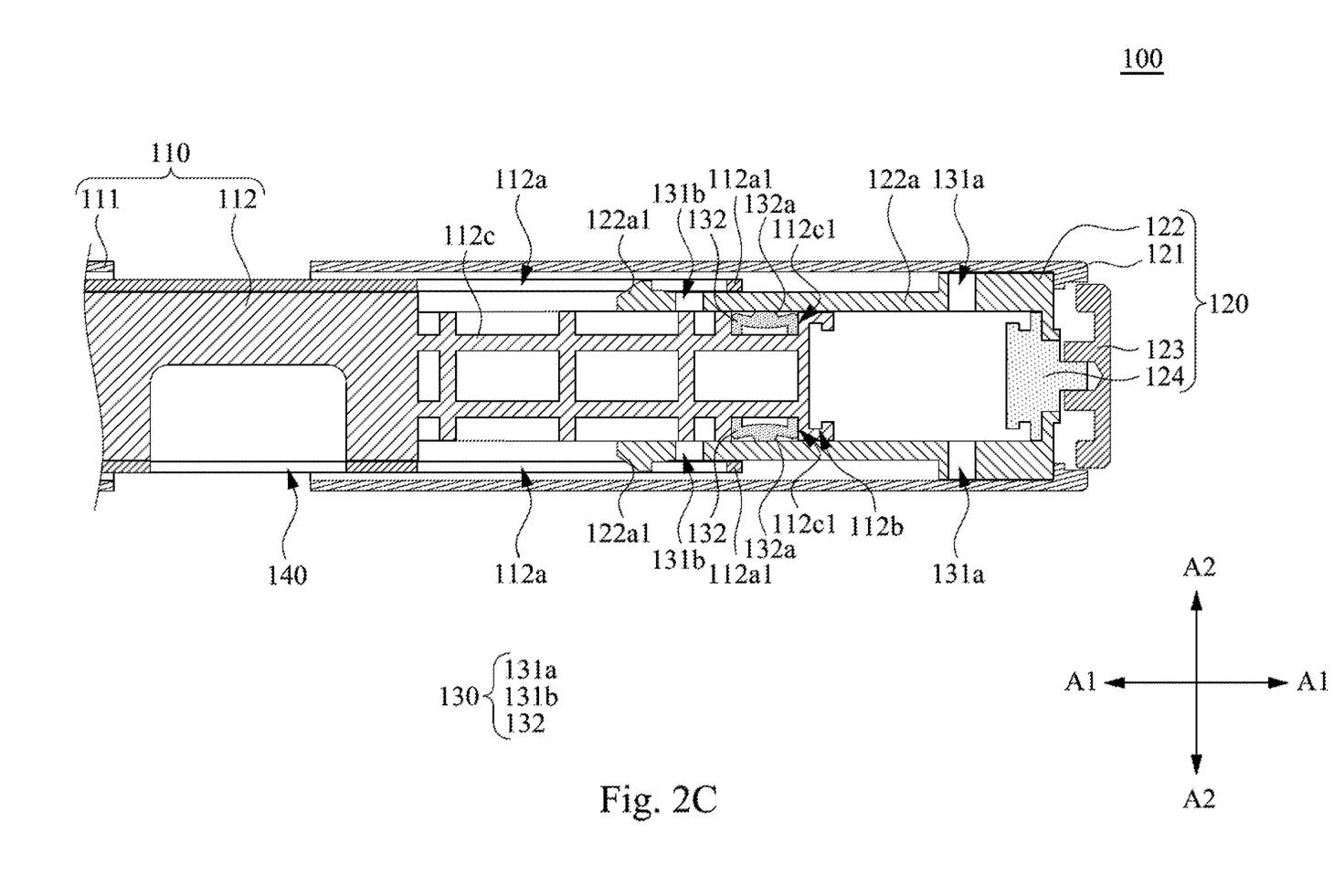
FIG. 2C is another partial cross-sectional view of the stylus pen in FIG. 2A.

As shown in FIGS. 2A and 2B, in the embodiment, each of the first engaging structures 131a, 131b is an engaging slot. The second engaging structure 132 is a protruding block. When the cover body 120 is located at the first position relative to the rod body 110, the second engaging structure 132 is partially engaged with the first engaging structure 131a and generates a first reverse force to the cover body 120 and the rod body 110 in the second axial direction A2. When the cover body 120 is located at the second position relative to the rod body 110, the second engaging structure 132 is partially engaged with the first engaging structure 131b and generates a second reverse force to the cover body 120 and the rod body 110 in the second axial direction A2. In addition, reference is made to FIG. 2C which is another partial cross-sectional view of the stylus pen 100 in FIG. 2A. As shown in FIG. 2C, when the cover body 120 is located at any position between the first position and the second position relative to the rod body 110, the cover body 120 slidably abuts against the second engaging structure 132, and the second engaging structure 132 generates a third reverse force to the cover body 120 and the rod body 110 in the second axial direction A2. Since the first reverse force and the second reverse force are smaller than/different from the third reverse force, the positioning module 130 can generate changes of force in the second axial direction A2 when the cover body 120 moves to the first position and the second position relative to the rod body 110, so as to provide the positioning feel. Specifically, when the cover body 120 is located at the position shown in FIG. 2C relative to the rod body 110, the second engaging structure 132 is pressed by the cover body 120. When the cover body 120 moves relative to the rod body 110 from the position shown in FIG. 2C to the first position or the second position, the second engaging structure 132 will elastically recover. It should be noted that, as shown in FIG. 2A, the number of the first engaging structures 131a is two and symmetrically located on opposite sides of the sleeve portion 112, the number of the first engaging structures 131b is two and symmetrically located on the opposite sides of the sleeve portion 112, and the number of the second engaging structures 132 is two and symmetrically located on the opposite sides of the sleeve portion 112. In this way, the two second engaging structures 132 can be engaged with the two first engaging structures 131a simultaneously, and can also be engaged with the two first engaging structures 131b simultaneously.

In some embodiments, the two first engaging structures 131a, 131b and the cover body 120 form a unitary structure and can be manufactured by, for example, an injection molding process, but the disclosure is not limited in this regard.

In some embodiments, the second engaging structure 132 is an elastic body and is detachably disposed on the sleeve portion 112 of the rod body 110. In this way, the wear between the cover body 120 and the positioning module 130 can be reduced, thereby effectively increasing the service life of the stylus pen 100. In some other embodiments, the second engaging structure 132 may be a mechanical component that can elastically recover after being pressed, such as an elastic sheet or other similar elements. In some embodiments, a distal end 112c of the sleeve portion 112 has a concave portion 112c1, and the second engaging structure 132 is accommodated in the concave portion 112c1. With the arrangement of the concave portion 112c1, the second engaging structure 132 can be easily installed on the sleeve portion 112. Not only that, the proportion of the second engaging structure 132 in the moving track of the cover body 120 can be adjusted flexibly, so that the sliding resistance of the cover body 120 relative to the positioning module 130 can be appropriately adjusted.

As shown in FIGS. 2A and 2B, in the embodiment, the second engaging structure 132 has a guiding inclined surface 132a. The guiding inclined surface 132a is configured to be engaged with the two first engaging structures 131a, 131b. The guiding inclined surface 132a is located at an outer edge of the second engaging structure 132. In this way, the wear between the cover body 120 and the positioning module 130 can be reduced when the second engaging structure 132 is engaged with and disengaged from the two first engaging structures 131a, 131b, thereby effectively increasing the service life of the stylus pen 100.

In some embodiments, the guiding inclined surface 132a is a part of a circular convex surface, but the disclosure is not limited in this regard.

In some other embodiments, the second engaging structure 132 and the sleeve portion 112 of the rod body 110 can form a unitary structure, and can be manufactured by, for example, an injection molding process, but the disclosure is not limited in this regard.

As shown in FIGS. 2A and 2B, in the embodiment, the cover body 120 includes a casing 121, an engaging member 122, and a connecting member 123. The casing 121 is configured to be sleeved onto the sleeve portion 112 of the rod body 110. An end of the engaging member 122 is disposed in the casing 121, and another end of the engaging member 122 is disposed on the sleeve portion 112. The engaging member 122 is configured to be slidably engaged with the sleeve portion 112. The connecting member 123 is disposed at the same ends of the casing 121 and the engaging member 122, and is connected to the casing 121 and the engaging member 122. Specifically, the sleeve portion 112 of the rod body 110 has a guiding groove 112a extending substantially along the first axial direction A1 at one end away from the main body portion 111. The engaging member 122 of the cover body 120 has an elastic arm 122a. The two first engaging structures 131a, 131b are two engaging slots disposed on the elastic arm 122a. The distal end of the elastic arm 122a has an engaging block 122a1. The engaging block 122a1 is slidably engaged in the guiding groove 112a. An end of the guiding groove 112a away from the main body portion 111 has a stopping block 112a1. The stopping block 112a1 is configured to stop the engaging block 122a1 so as to retain the engaging block 122a1 to be located in the guiding groove 112a. In this way, the cover body 120 can move between the first position and the second position relative to the rod body 110 along the first axial direction A1, and prevent the cover body 120 from rotating relative to the rod body 110 around the first axial direction A1. In some embodiments, the second engaging structure 132 and the elastic arm 122a are both elastic bodies, and the engaging member 122 is a sliding positioning member.

Furthermore, an end of the sleeve portion 112 of the rod body 110 away from the main body portion 111 has a buckling groove 112b. The cover body 120 further includes a buckling block 124. The buckling block 124 is disposed on the connecting member 123. In some embodiments, the buckling block 124 is an elastic body. When the cover body 120 moves to the first position relative to the rod body 110, the buckling block 124 is buckled to the buckling groove 112b, so as to further ensure that the cover body 120 can be completely sleeved onto the sleeve portion 112 of the rod body 110 without easily exposing the sleeve portion 112. In some other embodiments, the buckling block 124 may be a metal piece, but the disclosure is not limited in this regard.

In some other embodiments, the buckling groove 112b may be disposed on the connecting member 123 of the cover body 120 instead, and the buckling block 124 may be disposed on the sleeve portion 112 of the rod body 110 instead, which can also achieve the purpose of ensuring that the cover body 120 can be completely sleeved onto the sleeve portion 112.

In some other embodiments, the first engaging structures 131a, 131b may be disposed on the rod body 110 instead, and the second engaging structure 132 may be disposed on the cover body 120 instead, which can also achieve the purpose of providing a positioning feel when the cover body 120 moves to the first position and the second position relative to the rod body 110.

Figure 3A:
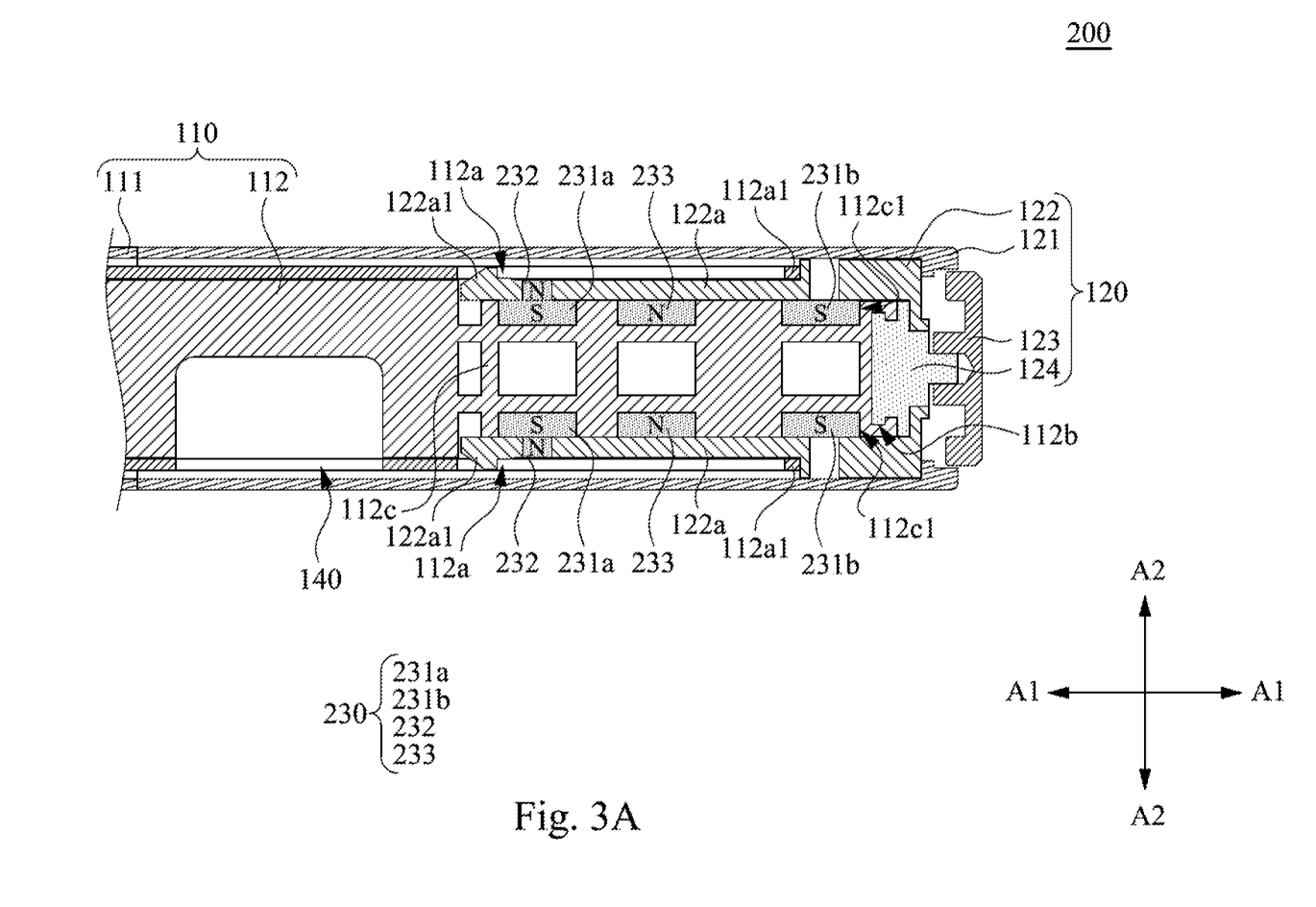
FIG. 3A is a perspective view of a stylus pen according to another embodiment of the disclosure, in which the cover body is located at a first position relative to the rod body.
Figure 3B:
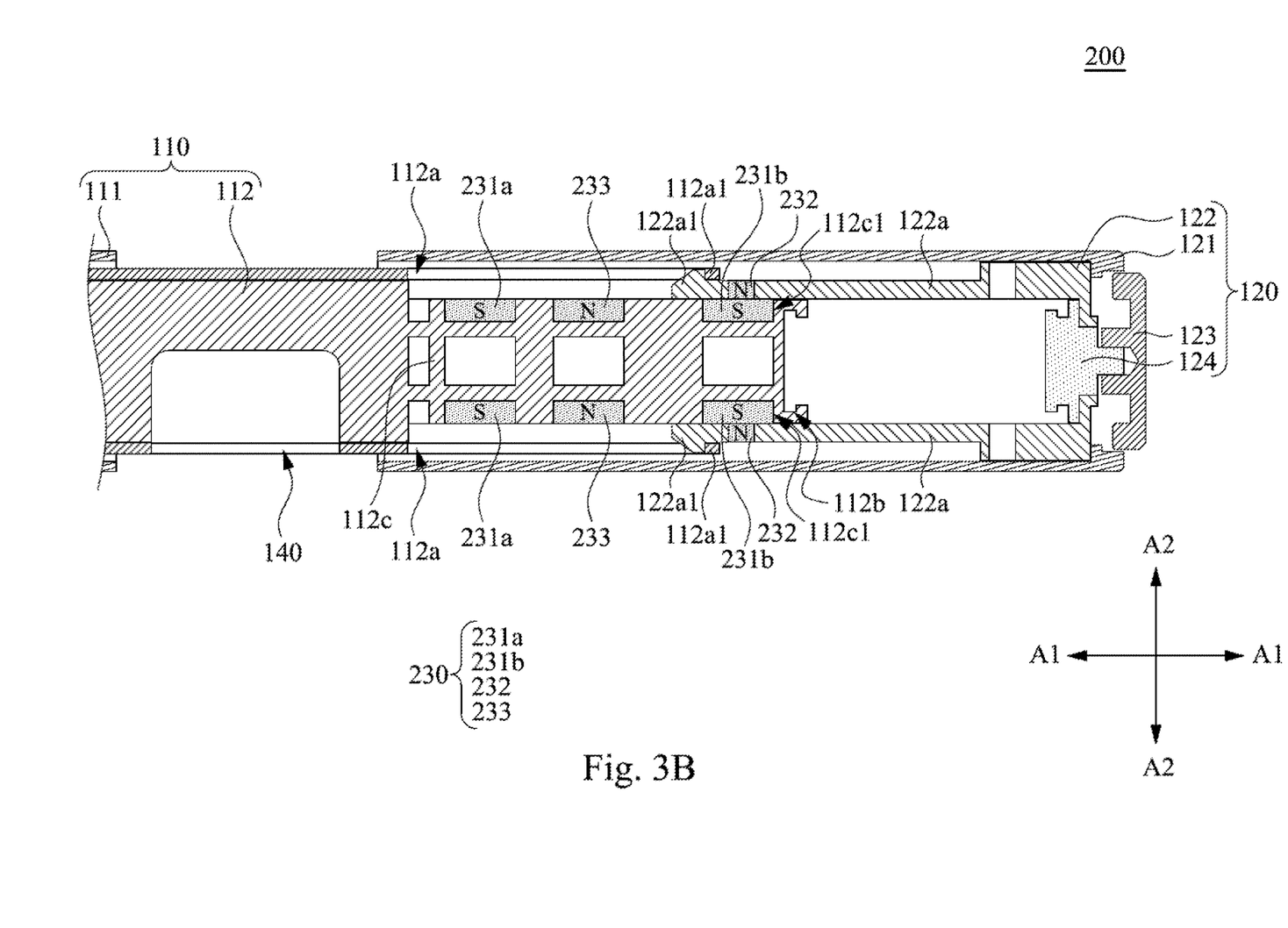
FIG. 3B is another perspective view of the stylus pen in FIG. 3A, in which the cover body is located at a second position relative to the rod body.

Reference is made to FIGS. 3A and 3B. FIG. 3A is a perspective view of a stylus pen 200 according to another embodiment of the disclosure, in which the cover body 120 is located at a first position relative to the rod body 110. FIG. 3B is another perspective view of the stylus pen 200 in FIG. 3A, in which the cover body 120 is located at a second position relative to the rod body 110. As shown in FIGS. 3A and 3B, in the embodiment, the stylus pen 200 includes the rod body 110, the cover body 120, and a positioning module 230, in which the rod body 110 and the cover body 120 are the same as or similar to those of the embodiment shown in FIG. 2A, so the same reference signs are used, and reference can be made to the relevant descriptions in the preceding paragraphs, which will not be repeated here. In other words, compared with the embodiment shown in FIG. 2A, the embodiment proposes the modified positioning module 230.

Specifically, in the embodiment, the positioning module 230 includes two first magnetic members 231a, 23ab and a second magnetic member 232. The first magnetic members 231a, 23ab are disposed on the sleeve portion 112 of the rod body 110. In some embodiments, as shown in FIG. 3A, the distal end 112c of the sleeve portion 112 away from the main body portion 111 has concave portions 112c1 accommodating the first magnetic members 231a, 231b. The second magnetic member 232 is disposed on the cover body 120. In some embodiments, the second magnetic member 232 is disposed on the elastic arm 122a to facilitate the replacement of other magnetic members with different magnetic forces. When the cover body 120 is located at the first position relative to the rod body 110, the second magnetic member 232 and the first magnetic member 231a are aligned in the second axial direction A2 and generate a first magnetic attraction force (i.e., the opposite polarities of the two face each other). When the cover body 120 is located at the second position relative to the rod body 110, the second magnetic member 232 and the first magnetic member 231b are aligned in the second axial direction A2 and generate a second magnetic attraction force (i.e., the opposite polarities of the two face each other). In this way, the positioning module 230 can provide a positioning feel when the cover body 120 moves to the first position and the second position relative to the rod body 110.

Figure 3C:
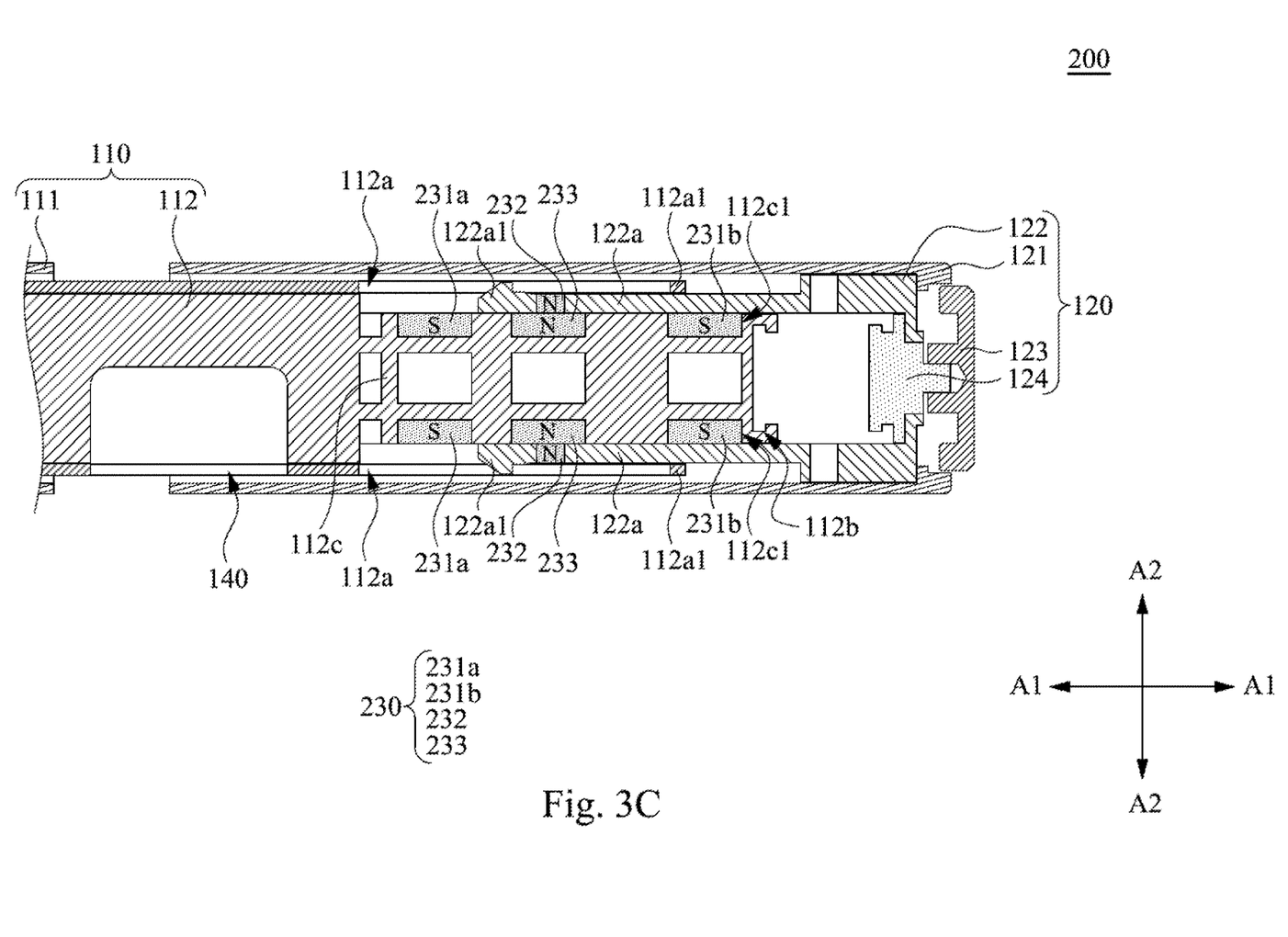
FIG. 3C is another perspective view of the stylus pen in FIG. 3A, in which the cover body is located at a third position relative to the rod body.

Reference is made to FIG. 3C. FIG. 3C is another perspective view of the stylus pen 200 in FIG. 3A, in which the cover body 120 is located at a third position relative to the rod body 110. As shown in FIGS. 3A to 3C, in the embodiment, the positioning module 230 further includes a third magnetic member 233. The third magnetic member 233 is disposed on the sleeve portion 112 of the rod body 110 and located between the first magnetic member 231a and the first magnetic member 231b. When the cover body 120 is located at the third position between the first position and the second position relative to the rod body 110, the second magnetic member 232 and the third magnetic member 233 are aligned in the second axial direction and generate a repulsive magnetic force (i.e., the identical polarities of the two face each other). Since the first magnetic attraction force and the second magnetic attraction force are different from the repulsive magnetic force, the positioning module 230 can generate changes of force in the second axial direction A2 when the cover body 120 moves to the first position and the second position relative to the rod body 110, thereby providing the positioning feel. Not only that, the aforementioned repulsive magnetic force can reduce the friction force between the cover body 120 and the rod body 110, thereby effectively reducing the wear between the cover body 120 and the rod body 110and increasing the service life of the stylus pen 200.

In other embodiments, the first magnetic members 231a, 231b and the third magnetic member 233 may be disposed on the cover body 120 instead, and the second magnetic member 232 may be disposed on the sleeve portion 112 of the rod body 110 instead, which can also achieve the purpose of providing the positioning feel when the cover body 120 moves to the first position and the second position relative to the rod body 110.

In other embodiments, the first magnetic members 231a, 231b, the second magnetic member 232, and the third magnetic member 233 are magnets, but the disclosure is not limited in this regard.

According to the foregoing recitations of the embodiments of the disclosure, it can be seen that in the stylus pen of the disclosure, the positioning module disposed between the sleeve portion of the rod body and the cover body can generate force changes on the cover body and the rod body when the cover body is located at the first position and the second position relative to the rod body. In this way, when the cover body moves to the first position and the second position relative to the rod body, a positioning feel can be provided.

Although the disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims.

What is claimed is:

1. A stylus pen, comprising:
    a rod body comprising a main body portion and a sleeve portion connected to each other;
    a cover body configured to be sleeved onto the sleeve portion, and configured to move relative to the rod body to a first position and a second position along a first axial direction, wherein the cover body comprises:
        a casing configured to be sleeved onto the sleeve portion; and
        an engaging member disposed in the casing and configured to be slidably engaged with the sleeve portion; and
    a positioning module disposed between the sleeve portion and the cover body, and configured to generate changes of force to the cover body and the rod body in a second axial direction when the cover body moves to the first position and the second position relative to the rod body, wherein the positioning module comprises an engaging structure, and the engaging structure is disposed on the engaging member.

2. The stylus pen of claim 1, wherein the second axial direction is substantially perpendicular to the first axial direction.

3. The stylus pen of claim 1, wherein when the cover body moves to the first position, the second position, and a third position between the first position and the second position, the positioning module respectively applies a first force, a second force, and a third force to the cover body and the rod body in the second axial direction, and the third force is different from the first force and the second force.

4. The stylus pen of claim 1, wherein the engaging member has an elastic arm, and the engaging structure is disposed on the elastic arm.

5. The stylus pen of claim 1, further comprising:
    an electrical connection port disposed on the sleeve portion, wherein when the cover body is located at the first position relative to the rod body, the electrical connection port is covered by the cover body, and when the cover body is located at the second position relative to the rod body, the cover body leaves and exposes the electrical connection port.

6. The stylus pen of claim 1, wherein an end of the sleeve portion away from the main body portion has a buckling groove, the cover body comprises a buckling block, and when the cover body moves to the first position relative to the rod body, the buckling block is buckled to the buckling groove.

7. A stylus pen, comprising:
    a rod body comprising a main body portion and a sleeve portion connected to each other;
    a cover body configured to be sleeved onto the sleeve portion, and configured to move relative to the rod body to a first position and a second position along a first axial direction, wherein the cover body comprises:
        a casing configured to be sleeved onto the sleeve portion; and
        an engaging member disposed in the casing and configured to be slidably engaged with the sleeve portion;
    a positioning module disposed between the sleeve portion and the cover body and comprising:
        two first engaging structures disposed on the engaging member; and
        a second engaging structure disposed on the rod body, wherein when the cover body is located at the first position relative to the rod body, the second engaging structure is engaged with one of the first engaging structures, and when the cover body is located at the second position relative to the rod body, the second engaging structure is engaged with another of the first engaging structures.

8. The stylus pen of claim 7, wherein when the cover body is located at a third position between the first position and the second position relative to the rod body, the second engaging structure slidably abuts against the cover body.

9. The stylus pen of claim 7, wherein each of the first engaging structures is an engaging slot, and the second engaging structure is a protruding block.

10. The stylus pen of claim 7, wherein the second engaging structure is an elastic body.

11. The stylus pen of claim 10, wherein the sleeve portion has a concave portion, and the second engaging structure is accommodated in the concave portion.

12. The stylus pen of claim 7, wherein the second engaging structure has a guiding inclined surface, and the guiding inclined surface is configured to be engaged with the first engaging structures.

13. The stylus pen of claim 7, wherein the engaging member has an elastic arm, and one of the first engaging structures is disposed on the elastic arm.

14. The stylus pen of claim 7, wherein an end of the sleeve portion away from the main body portion has a buckling groove, the cover body comprises a buckling block, and when the cover body moves to the first position relative to the rod body, the buckling block is buckled to the buckling groove.

15. A stylus pen, comprising:
   a rod body comprising a main body portion and a sleeve portion connected to each other;
   a cover body configured to be sleeved onto the sleeve portion, and configured to move relative to the rod body to a first position and a second position along a first axial direction, wherein the cover body comprises:
      a casing configured to be sleeved onto the sleeve portion; and
      an engaging member disposed in the casing and configured to be slidably engaged with the sleeve portion;
   a positioning module disposed between the sleeve portion and the cover body and comprising:
      two first magnetic members disposed on the rod body; and
      a second magnetic member disposed on the engaging member,
   wherein when the cover body is located at the first position relative to the rod body, the second magnetic member and one of the first magnetic members are aligned in a second axial direction and attract each other, and when the cover body is located at the second position relative to the rod body, the second magnetic member and another of the first magnetic members are aligned in the second axial direction and attract each other.

16. The stylus pen of claim 15, wherein the positioning module further comprises:
   a third magnetic member disposed on the rod body and located between the first magnetic members,
   wherein when the cover body is located at a third position between the first position and the second position relative to the rod body, the second magnetic member and the third magnetic member are aligned in the second axial direction and repel each other.

* * * * *